(12) United States Patent
Lin

(10) Patent No.: US 6,989,177 B2
(45) Date of Patent: Jan. 24, 2006

(54) METHOD FOR MAKING A COLOR FILTER INCLUDING ATTACHING A MOLD TO A SUBSTRATE AND THEN FILLING WITH A PHOTOPOLYMER SOLUTION

(75) Inventor: Dhei-Jhai Lin, Hsinchu (TW)

(73) Assignee: Polyoptocom Corp., Miaoli (TW)

( * ) Notice: Subject to any disclaimer, the term of this patent is extended or adjusted under 35 U.S.C. 154(b) by 65 days.

(21) Appl. No.: 10/659,283

(22) Filed: Sep. 11, 2003

(65) Prior Publication Data

US 2005/0042797 A1 Feb. 24, 2005

(30) Foreign Application Priority Data

Jun. 16, 2003 (TW) ........................................ 92116221 A

(51) Int. Cl.
 *C08J 7/04* (2006.01)
 *C08J 7/14* (2006.01)
 *B05D 3/06* (2006.01)
 *H01L 21/00* (2006.01)

(52) U.S. Cl. ...................... 427/510; 427/514; 427/558; 438/70; 438/72

(58) Field of Classification Search .................. 438/70, 438/72; 257/432, 490; 349/106, 107, 114; 427/68, 164, 165, 282, 514; 422/558
See application file for complete search history.

(56) References Cited

U.S. PATENT DOCUMENTS 6,063,527 A * 5/2000 Nishikawa et al. ............ 430/7
6,078,377 A * 6/2000 Tomono et al. ............. 349/143

* cited by examiner

Primary Examiner—William M. Brewster
(74) Attorney, Agent, or Firm—Birch, Stewart, Kolasch & Birch, LLP

(57) ABSTRACT

A method for making a color filter includes the steps of: (1) providing a removable mold having an intaglio surface with a plurality of groove units formed therein, the groove units being arranged in predetermined pattern; (2) attaching the removable mold to a transparent substrate, thereby the intaglio surface and the transparent substrate cooperatively forming a plurality of channel units; (3) filling the channel units with a photopolymer solution containing colorants; (4) applying an ultraviolet light to the photopolymer solution through the transparent substrate so as to cure the polymer to the transparent substrate; and (5) removing the mold with the patterned polymer layer formed on the transparent substrate. The present method circumvents the conventional troublesome and time-consuming photolithographic process for forming a color filter that has to be unduly repeated three times.

10 Claims, 8 Drawing Sheets

METHOD FOR MAKING A COLOR FILTER INCLUDING ATTACHING A MOLD TO A SUBSTRATE AND THEN FILLING WITH A PHOTOPOLYMER SOLUTION

BACKGROUND OF THE INVENTION

1. Field of the Invention

The present invention generally relates to a novel method and an apparatus for preparing a transparent substrate with a patterned polymer layer formed thereon, and more particularly to a method and an apparatus for manufacturing a color filter for use in a liquid crystal display. And more specifically, the present invention relates to a flat color filter made by the novel method.

2. Description of Related Art

Color liquid crystal flat panel displays have been popularly employed recently in notebook type personal computers, monitors, televisions, and in many other pocketable devices, such as personal digit assistants(PDAs), mobile phones and so on. Generally, a color liquid crystal display comprises a backlight module for supplying a uniform surface light source, a color filter formed with a first electrode, a transparent substrate formed with a second counter electrode, a liquid crystal layer filled between the color filter and the transparent substrate to form a liquid crystal cell, first and second polarizer sheets disposed at opposite sides of the liquid crystal layer, a driving circuit, a signal and power supply controlling system. The liquid crystal cell, the first and second polarizer sheets cooperate to form a plurality of light valves for controlling flowing of light therethrough.

There are generally two types of the color filter popularly used in the liquid crystal displays: transmissive and transflective color filters. A typical transmissive color filter comprises a transparent substrate, and a color filter film formed on the transparent substrate. Each pixel of the color filter film is composed of red(R), green(G) and blue(B) sub-pixels. Each sub-pixel cell operates by transmitting or disrupting light by means of the light valve. The sub-pixels of the color filter is generally delimited by an opaque black matrix. When light passes through a sub-pixel of the color filter, all the unwanted colors are blocked, leaving only the specific corresponding color of the sub-pixel. A typical transflective type color filter is similar to the transmissive type color filter except that a patterned reflective film is interposed between the transparent substrate and the color filter film. The reflective film comprises a plurality of light transmitting units whereat backlight passes once through the color filter film, and a plurality of light reflective units whereat ambient light enters and reflected out of the display with the light passes twice through the color filter film. There is another type of transflective color display wherein the color filter film is made on a transparent substrate coated with partially reflective film. The partially reflective film consists of multiple layers of thin films, which allows certain portion of incident light to pass and reflects the rest. The color filter thus made is basically the same as the process for a transmissive type color filter.

On the whole, color filter is one of the most critical elements in determining the color image quality in a display, and the color filter takes a significant part in the overall cost for manufacturing liquid crystal display devices. Apart from being used in the liquid crystal displays, the color filters are also applicable to organic light emitting displays and plasma display panels.

Many efforts have been paid in the past to the development of low cost manufacturing methods with high performance product, but in this inventor's view, satisfactory result were hardly achieved. In the following paragraphs, typical known processes for preparing color filters will be discussed.

First, a dyeing process is known. With this process, a polymeric material is formed on a glass substrate as color reception layer. Thereafter, the colored pattern is formed by immersing the substrate in a dyeing bath for selectively coloring the color reception layer. Usually, additional photolithographic means were used to mask part of the color reception layer to guarantee no mix dyeing. This dyeing step is repeated three times for the three primary colors of red (R), green (G) and blue (B) to obtain a colored layer of R, G and B on the substrate.

Second, there is known a pigment dispersion process, and it is most popular in recent years. With this process, a photosensitive resin solution containing pigments in a dispersed state is applied on a substrate and dried to form a colored layer, then the layer is patterned via photolithographic means to produce a mono-color pattern. This pattern forming step is repeated three times to obtain a layer colored to the three primary colors of R, G and B.

Third, an electrodeposition process is known. With this process, a stripe type transparent electrode is formed on a substrate by photo etching process and a first color is produced by means of electrodeposition by immersing the patterned electrode into an electrodeposition coating solution containing a pigment, ED resin and an electrolyte solvent system, and with selective stripe electrodes for one color electrically connected in the circuit loop. Then, this step of producing a color is repeated three times to form a colored layer of the three primary colors of R, G and B. Finally, the formed layer is baked and hardened to complete the process.

Fourth, there is known a printing process using colored ink with pigments dispersed in thermosetting or UV curable resin, repeating a printing operation three times for the three primary colors of R, G and B and curing the resin to produce a colored layer.

What is common to all the above listed processes is that a same step has to be repeated three times for forming a colored layer of the three primary color of R, G and B and consequently increase the manufacturing cost. Additionally, a manufacturing method involving a large number of steps is normally accompanied by a low yield.

SUMMARY OF THE INVENTION

In view of the above, an object of the present invention is to provide a method for making a color filter for use in a liquid crystal display, which is simple and has a minimized manufacturing cost.

A further object of the present invention is to provide a method for making a color filter for use in a transflective type liquid crystal display.

Another object of the present invention is to provide a flat color filter by the methods of this invention.

A still further object of the present invention is to provide a method for forming a patterned polymer layer on a transparent substrate.

Also, a further object of the present invention is to provide an apparatus for making a color filter for use in a liquid crystal display.

In order to achieve the objects set forth above, a method for making a color filter for use in a liquid crystal display in accordance with a first embodiment includes the steps of: (1) providing a removable mold having an intaglio surface with a plurality of groove units formed therein, the groove units being arranged in predetermined pattern; (2) attaching the removable mold to a transparent substrate, thereby the intaglio surface and the transparent substrate cooperatively forming a plurality of channel units; (3) filling the channel units with a photopolymer solution containing colorants; (4) applying an ultraviolet light to the photopolymer solution through the transparent substrate so as to cure the polymer to the transparent substrate; and (5) removing the mold with the patterned polymer layer formed on the transparent substrate. Wherein, in step (2), the transparent substrate is generally pre-overlaid with a black matrix, the removable mold is then attached to a transparent substrate, with the patterned groove superimposed with light-passing portions of the black matrix. Alternatively, the black-colored photoresist may be applied to the treated transparent substrate after step (5), the unwanted portions are then removed by photolithography process.

A method for making a color filter for use in a transflective type liquid crystal display in accordance with a second embodiment of the present invention comprises the steps of: (1) providing a removable mold having an intaglio surface with a plurality of groove units arranged in a predetermined pattern; (2) attaching the removable mold to a transparent substrate having a patterned reflective film coated thereon, thereby the intaglio surface and the transparent substrate cooperatively forming a plurality of channel units; (3) introducing a photopolymer solution containing colorants into the channel units; (4) applying a scattering ultraviolet light to the photopolymer solution through the transparent substrate so as to cure the polymer to the transparent substrate; (5) removing the mold with the patterned colored photopolymer layer formed on the patterned reflective film on the transparent substrate; and (6) applying a black-colored photoresist layer to the treated transparent substrate, exposing the black-colored photoresist with UV light from the opposite side of the transparent substrate and then develop a black colored polymer pattern on the sustrate.

The present invention also provide a method for forming a patterned polymer layer on a transparent substrate, the method comprising the steps of: (1) providing a removable mold having an intaglio surface with a patterned groove defined therein; (2) attaching the removable mold to a transparent substrate, thereby the intaglio surface and the transparent substrate cooperatively forming a patterned channel; (3) filling the patterned channel with a photopolymer solution; (4) applying an ultraviolet light to the photopolymer solution through the transparent substrate so as to cure the photopolymer solution to the transparent substrate; and (5) removing the removable mold with the patterned photopolymer layer formed on the transparent substrate.

An apparatus for making a color filter for use in a liquid crystal display, the apparatus in accordance with the present invention comprises: a main body including an intaglio layer having a surface defining a plurality of groove units therein; the groove units being arranged in a predetermined pattern; the surface of the intaglio layer being adapted for contact with a transparent substrate thereby cooperatively forming a plurality of chambers for receiving corresponding colored photopolymer solution to be cured therein; and at least one opening in communication with the groove units.

Other objects, advantages and novel features of the invention will become more apparent from the following detailed description when taken in conjunction with the accompanying drawings, in which:

DETAILED DESCRIPTION OF EMBODIMENTS OF THE PRESENT INVENTION

Reference will now be made to the drawings to describe the embodiments of the present invention in detail.

Figure 1:
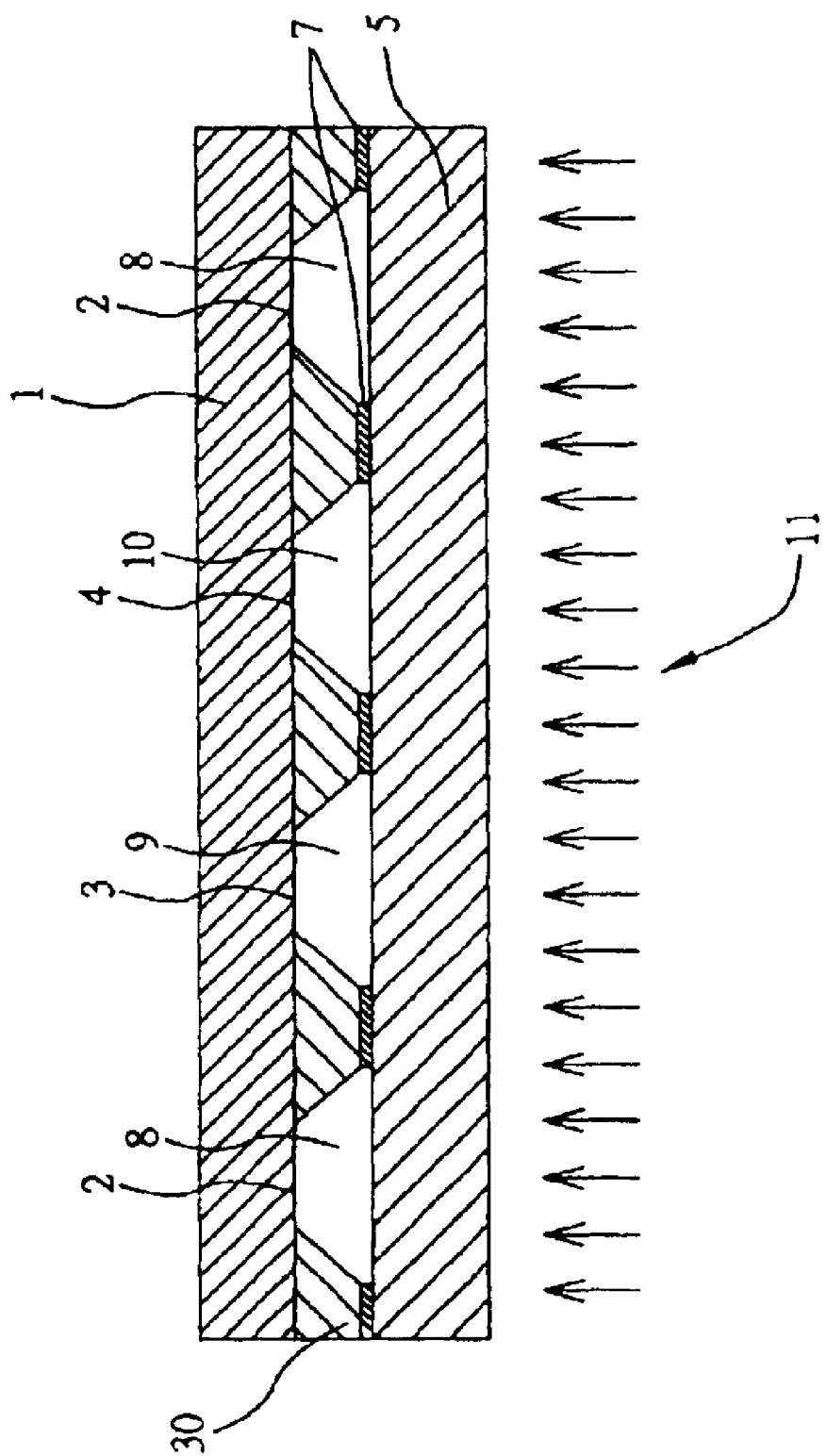
FIG. 1 is a schematic cross-sectional view showing a removable mold attached to a transparent substrate in accordance with a first embodiment of the present invention.
Figure 2:
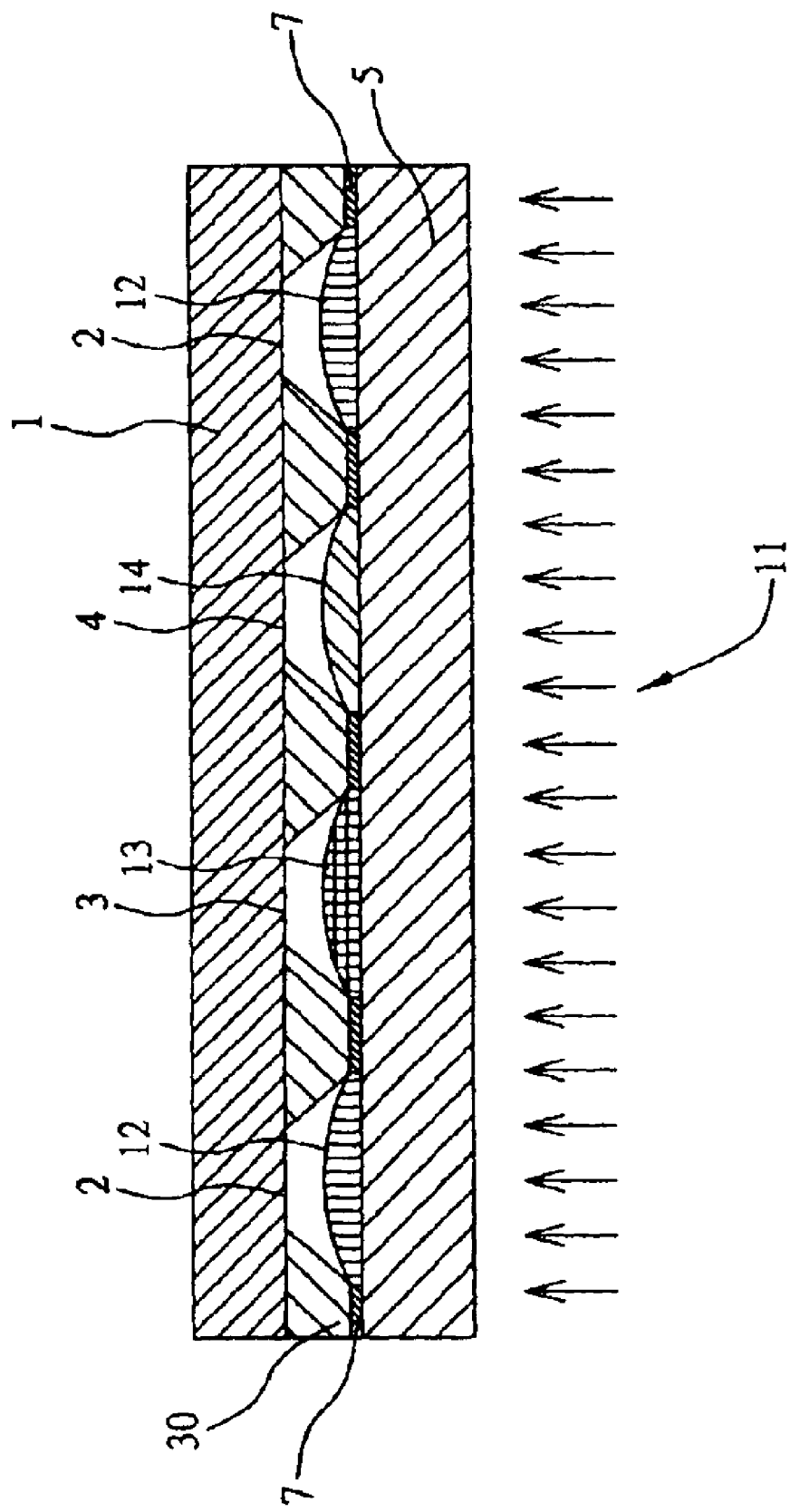
FIG. 2 is a schematic cross-sectional view showing colored photopolymer cured in the removable mold of FIG. 1.

Referring to FIGS. 1 and 2, a method for making a color filter for use in a liquid crystal display in accordance with a first embodiment of the present invention comprises the steps of: (1) providing a removable mold 1 having an intaglio surface with a plurality of groove units 2, 3, 4 formed therein, the groove units 2, 3, 4 being arranged in a predetermined pattern; (2) attaching the removable mold 1 to a transparent substrate 5, thereby the intaglio surface and the transparent substrate 5 cooperatively forming a plurality of corresponding channel units 8, 9, 10; (3) introducing a photopolymer solution containing colorants into the channel units 8, 9, 10; (4) applying an ultraviolet light 11 to the photopolymer solution through the transparent substrate 5 so as to cure the polymer to the transparent substrate 5; and removing the removable mold 1 with the cured patterned colored photopolymer sub-pixels 12, 13, 14 formed on the transparent substrate 5. Wherein, in step (2), the transparent substrate is first overlaid with a black matrix, the removable mold is then attached to a transparent substrate, with the patterned groove superimposed with light-passing portions of the black matrix. Alternatively, the black-colored photoresist may be applied to the treated transparent substrate after step (5), the unwanted portions are then removed by photolithography process. The step of forming the black matrix on the substrate will be explained in detail below.

Figure 3:
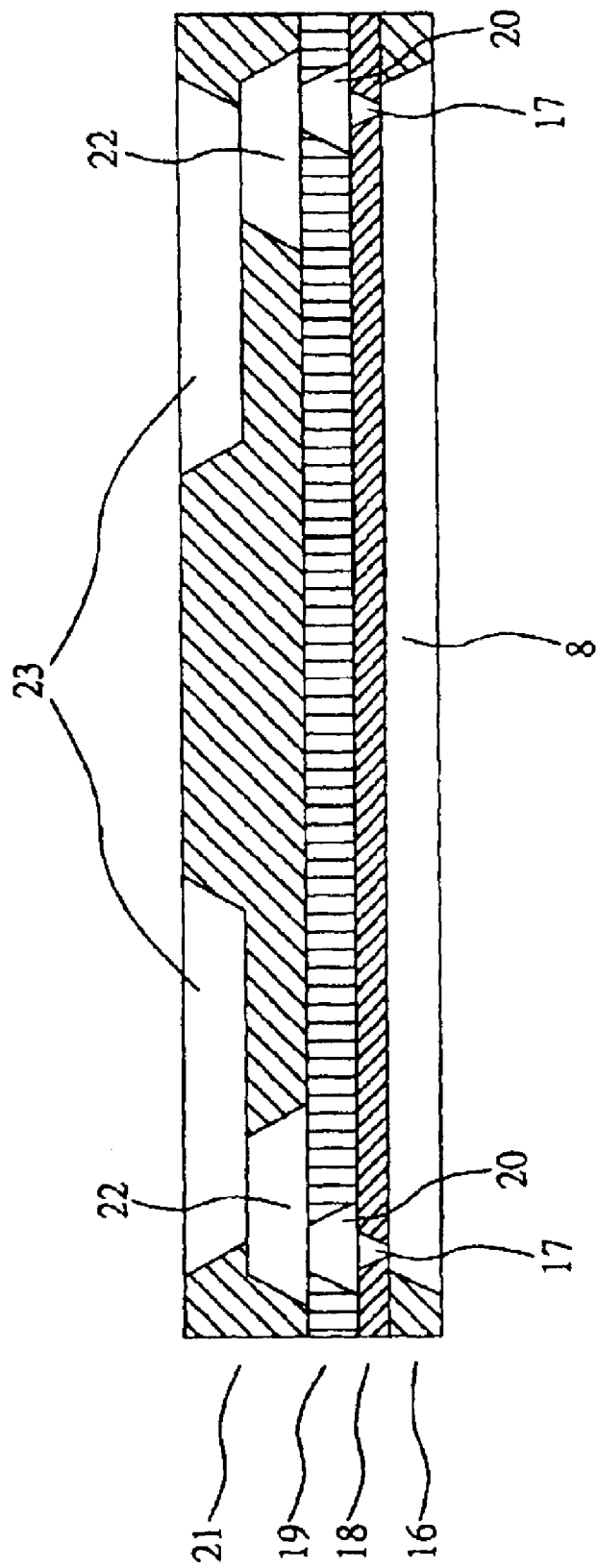
FIG. 3 is a schematic cross-sectional view of a channel unit of the removable mold of the present invention.

FIG. 3 depicts a schematic cross-sectional view showing the channel unit 8 of the removable mold 1. Also referring to FIG. 4, in step (1), the removable mold 1 comprises an intaglio layer 16, an intermediate layer 18, a shunt layer 19 and a feeding layer 21 stacked one on another in that order. The intaglio layer 16 comprises a plurality of partition walls 30 (see FIG. 6) and a plurality of groove units 2, 3, 4 separated by the partition walls 30. The groove units 2, 3, 4 are arranged in a predetermined pattern. The groove units 2, 3, 4 are generally classified into three types, and are for respectively receiving red-colored, green-colored, and blue-colored photopolymer solution. Correspondingly, the shunt layer 19 comprises three types of channels 20 defined therein for flowing red, green and blue colored photopolymer solution therethrough, respectively. The channels 20 of the shunt layer 19 generally run perpendicular to the groove units 2, 3, 4 of the intaglio layer 16. The intermediate layer 18 comprises a plurality of through holes 17 located where the channels 20 intersects the groove units 2, 3, 4. The channels 20 are in communication with the groove units 2, 3, 4 via the through holes 17. The feeding layer 21 comprises a plurality of inlet holes 22 and a plurality of feeding openings 23. The feeding openings 23 are in communication with the channels 20 via the inlet holes 22. The removable mold 1 further comprises a plurality of outer tubes (not shown) for flowing gases or solvents therethrough, a plurality of valves (not shown) for regulating the flow of the gases and solvents, and a vacuum pump (not shown).

Generally, the removable mold 1 can be made of any metallic material in the form of a sheet that is processable by conventional photo etching process for the purpose of defining the through holes 17 and the channels 20 therein. Preferably, the suitable material for the removable mold 1 can be selected from stainless steel, copper, aluminum, or Iron-Nickel Alloy as they are commonly available in sheet commercially. Alternatively, all or part of the removable mold 1 can be made of photo sensitive polymers, which are easily processable by photolithographic means. For examples, such as photo sensitive polyimides, epoxy resins or phenolic resins modified to carry acrylic functionalities, which utilize free radical photopolymerization chemistry in the process, or other photopolymers such as epoxy resins, which utilize the chemistry of cationic photopolymerization. Furthermore, flat substrate like glass sheet or polished engineering plastics or metal sheet can be used as base substrate for carrying the layers described above in assembly or photo etching and photolithography processes. A setting of tubes and valves can also replace the feeding layer and connected to the ends of channels in the shunt layer when a flat base substrate is used.

Sizes of the groove units 2, 3, 4 of the intaglio layer 16, the through holes 17 of the intermediate layer 18, the channels 20 of the shunt layer 19, and the inlet holes 22 of the feeding layer 21 are configured according to a given resolution of the color filter. For instance, as to a large-sized liquid crystal display, or a pocketable small-sized liquid crystal display, a center to center pitch between two neighboring sub-pixels is generally around 100 micrometer. An edge-to-edge spacing between two neighboring sub-pixels (see FIG. 1) is generally in the range below 30 micrometer. Correspondingly, the size of the groove units 2, 3, 4 is preferably around 100 micrometer, the diameter of the through holes 17 is preferably less than 100 micrometer, the width of the channels 20 is generally in the range from 100 to 900 micrometer. The inlet holes 22 may have a higher tolerance of configuration, and can be easily made by mechanical drilling. Thickness of each of the intaglio layer 16, the intermediate layer 18, the shunt layer 19, and the feeding layer 19 is generally more than 10 micrometer. A tolerable alignment variation, which is an alignment offset between the through holes 17 and the channels 20 or the groove units 2, 3, 4, is preferably kept below 10 micrometer, and more preferably no more than 5 micrometer.

The feeding layer 21, the shunt layer 19, the intermediate layer 18, and the intaglio layer 16 of the removable mold 1 can be separately prepared and then be integrated together with adhesive resins. The adhesive resins should be insoluble in a solvent that is used in the colored photopolymer solution. The adhesive resin can be selected from pressure-sensitive adhesives, hot-melt adhesives, silicon, or rubber adhesives. Alternatively, the adhesive resins can be thermosetting polymers, such as unsaturated acrylic resins, epoxy resins, or melamine resins.

The groove units 2, 3, 4, and the partition walls 30 of the intaglio layer 18 are generally formed by photolithography process. As described above, the intaglio layer 18 can be formed of metallic materials. They can be electroformed on the intermediate layer with a patterned plating resist defining the grooves on the intermediate layer surface or they can be etched out of the metallic intermediate layer with an etching resist pattern protecting the partition walls during the process. Such plating and etching processes are common in the printed circuit board industry. Alternatively, the intaglio layer 18 can also be made of photopolymers such as photoresists, and preferably negative type photoresists. Such a photopolymer pattern can be formed directly on the intermediate layer surface, or it can be made on a relief substrate and then adhere and transferred to the intermediate layer surface. The photopolymer preferably contain dyes or pigments that are capable of absorbing ultraviolet light. The through holes 16 in the intermediate layer and the channels 17 in the shunt layer can be defined by conventional photo etching technique, i.e. photoresist coating, exposure, develop, etching and so on. Alternatively, laser drilling is also commercially available and suitable to apply for this invention. After the intaglio layer 16, the intermediate layer 18, the shunt layer 19, and the feeding layer 19 are assembled the metallic portion of the mold which is exposed is preferably coated with a layer of inert metal by an electroplating process or a chemical plating process, or more preferably coated with a protective resin by electodeposition process. In general the use of layering structure in the removable mold is mainly for the purpose of a clear disclosure of this invention. Double side alignment and half etching techniques in the photo etching process of metal sheet, as well as three dimensional building up of structures using photopolymer process and combinations of both processes are also applicable for the fabrication of the removable mold, and are well known to people skilled in the art.

In step (2), the removable mold 1 is attached to a transparent substrate 5, thereby the intaglio layer 16 and the transparent substrate 5 cooperatively forming a plurality of channel units 8, 9, 10. Referring back to FIG. 1, the surface of the intaglio layer 16 interfaces with the transparent substrate 5, and top surfaces of the partitions pressingly contact with the corresponding black matrix 7 that is preformed on the transparent substrate 5. The channel units 8, 9, 10 are for receiving corresponding colored photopolymer solutions, in correspondence with red, green, and blue sub-pixels. For instance, the channel units 8, 9, 10 are for receiving red-colored, green-colored, and blue-colored photopolymer solutions in a later step, respectively. The removable mold 1 is generally attached to a transparent substrate 5 by applying a pressure by means of press, or by means of vacuum compression.

Figure 4:
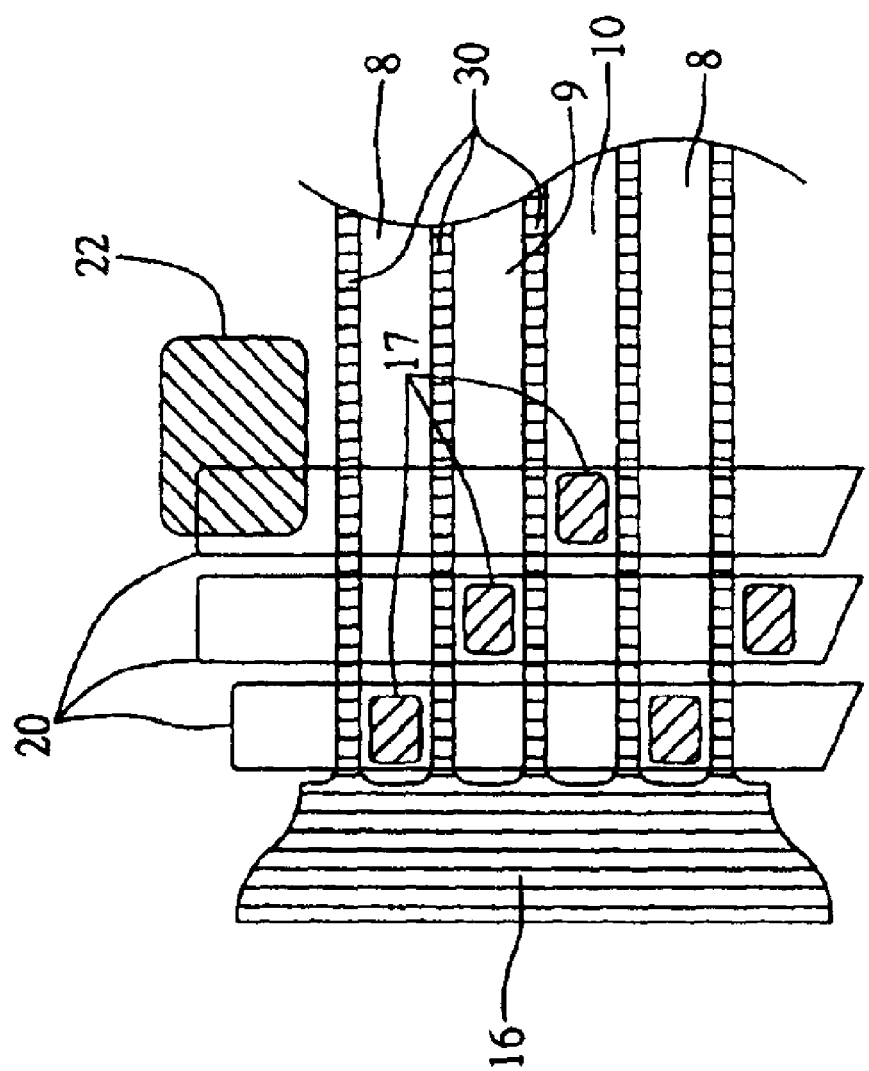
FIG. 4 is a schematic view showing interconnection relationships between an intaglio layer, an intermediate layer, a shunt layer and a feeding layer of the removable mold of FIG. 3.

In step (3), the colored photopolymer solution containing colorants is introduced into the channel units 8, 9, 10. Referring to FIGS. 3–4, the colored photopolymer solution is first fed into the channels 20 of the shunt layer 19 via the feeding opening 23. The red-colored, the green-colored, and the blue-colored photopolymer solutions are then guided by the channels 20 and are filled into the corresponding channel units 8, 9, 10, respectively.

Suitable photopolymer solution containing colorants can be selected from color resist commercially available for the color filter manufacturing industry. Also suitable photopolymer systems containing colorant may comprise colorants such as dyes or pigments, photo-induced initiator, a solvent, and photo crosslinkable polymers, oligomers and monomers. The colored photopolymer solution may further comprises additives like a dispersant for stabilizing the dispersion of the colorants in the solution, a thermal crosslinking agent, or a levering agent for improving a flatness of the color filter film. Suitable composition of the colored photopolymer solution is described, for examples, in U.S. Pat. No. 6,515,644 issued on Feb. 4, 2003 to Yamagata, et al., U.S. Pat. No. 6,348,298 issued on Feb. 19, 2002 to Sakurai, et al., U.S. Pat. No. 6,284,432 issued on Sep. 4, 2001 to Furubayashi, et al., U.S. Pat. No. 6,475,683 issued on Nov. 5, 2002 to Kashiwazaki, which are incorporated herein by reference. In the present invention, a viscosity of the obtained colored photopolymer solution is preferably less than 100 centipoise (cps).

In step (4), the ultraviolet light 11 is applied to the colored photopolymer solution contained in the channel units 8, 9, 10 through the transparent substrate 5 so as to cure the colored polymer to the transparent substrate 5. After curing, the solvent and the remains of the uncured colored polymer contained in the channel units can be evacuated by means of introducing fresh solvent or air into the channel units. The removable mold 1 is then removed with the patterned colored polymer layer formed on the transparent substrate 5. The removable mold 1 is advantageously reusable.

Figure 5:
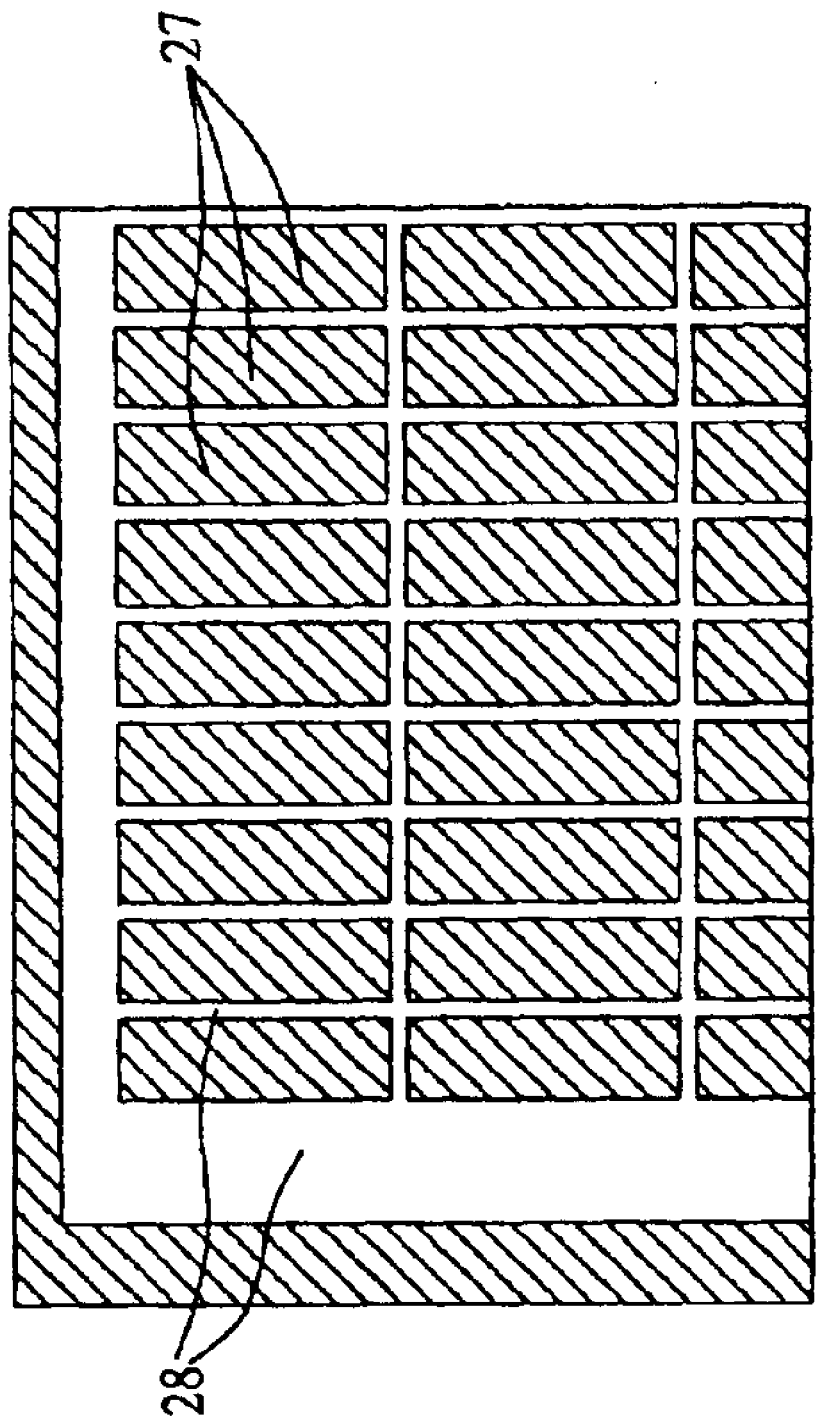
FIG. 5 is a schematic view of a mold used for forming a black matrix on the transparent substrate.

Alternatively, the black matrix pattern on the transparent substrate can also be formed similarly as described for the red, green and blue colored films. FIG. 5 is a schematic cross-sectional view of a mold used for forming the black matrix 7 on the transparent substrate 5. The mold comprises a plurality of blocks 27 having flat top surfaces arranged corresponding to the patterned sub-pixels, and a plurality of grooves 28 interposedly defined among the blocks for receiving black-colored photopolymer. The process of forming the black matrix 7 on the transparent substrate 5 is similar to the process of forming red, green, blue sub-pixels on the transparent substrate 5. The mold is first attached to the transparent substrate 5; the black-colored photopolymer solution is then introduced in the grooves 28. After curing, the desired patterned black matrix 7 is thus formed on the transparent substrate 5. It is usually desirable for the black matrix pattern being thermally baked to reach high degree of cure before the process for the other colors.

In order to achieve a desired thickness and filter performance of the color filter, an additional uncolored transparent photopolymer film (not shown) is preferably formed on the transparent substrate 5 prior to or after forming the red, green, and blue sub-pixels thereon. Composition of the additional film could be similar to the composition of the colored photopolymer solution except that the additional film does not contain colorants. The process of forming the additional film is similar to the process of forming the colored sub-pixels. For the additional film after forming of the colored film, the solvent and the remains of the uncured colored photopolymer contained in the channel units are evacuated and replaced by a photopolymer solution that does not contain colorants, to fill the channels. After that, the photopolymer solution is subject to an ultraviolet irradiation such that the photopolymer is cured into a leveling layer overlying the cured colored photopolymer. After the mold is open, the leveling layer is heat treated so as to obtain a better leveled flat surface. The additional uncolored leveling polymer layer is preferably a photopolymer containing lower degree of crosslinking before the final heat treatment, such that leveling of the film can be more easily achieved.

Figure 6:
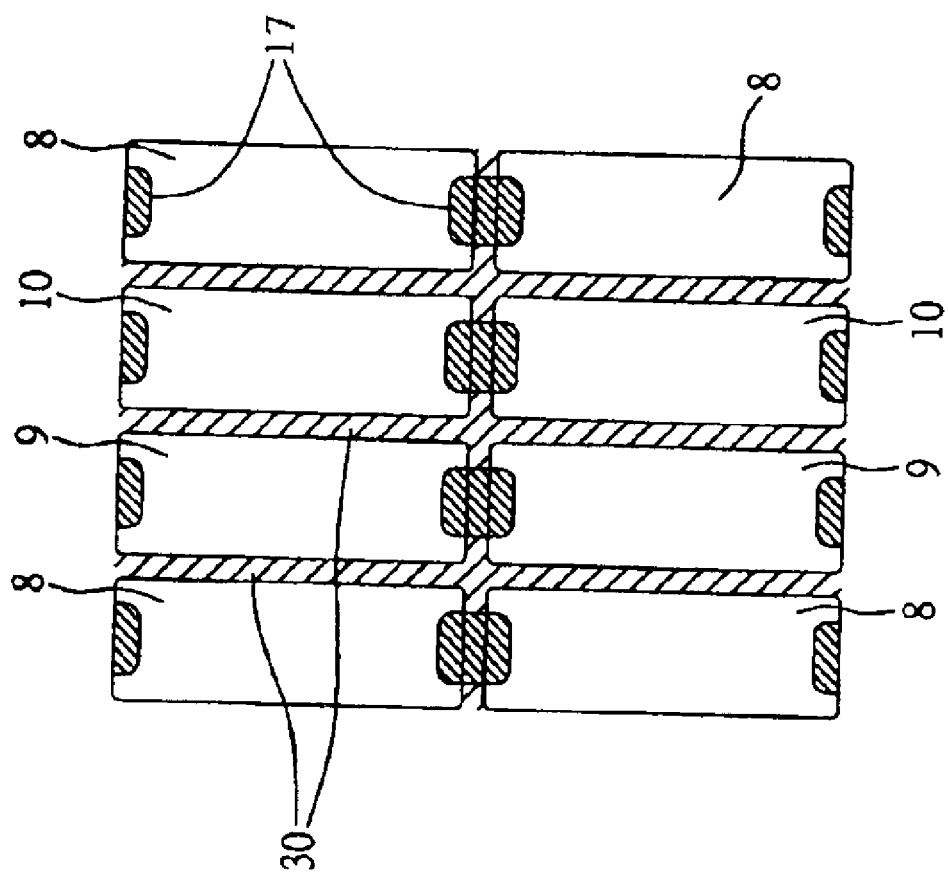
FIG. 6 is a schematic view showing interconnection relationship between groove units and through holes in a intermediate layer of the present invention.

Alternatively, this invention provides a method to first form the red, green, and blue sub-pixels on a transparent substrate without a preformed black matrix pattern, and after the mold is opened, the transparent substrate is then coated with a black colored photoresist and exposed the same to UV light from the back side of the substrate and followed by developing the image to from a black matrix. FIG. 6 is a top view of the intaglio layer surface of the removable mold 1 for this method. Wherein the partition walls 30 are located where the red, green, and blue sub-pixels 29 interface with each other, and connecting holes 31 are located in the intermediate layer 18 covering the neighboring sub-pixels of the same color. The connecting holes allow the passage of the colored photopolymer solution between the sub-pixel chambers of the same color. Therefore when the black-colored photoresist is applied and cured from the back side of the substrate, a self aligned black matrix pattern will be produced. The black photoresist covering the colored sub-pixel surfaces, as the colorants in the colored film absorb most of the ultraviolet light radiation and results in low degree of cure and hence low resistance to developer, is then readily removed with a developer. The method of back exposure to develop a black matrix pattern on a glass substrate with the colored pattern already formed is known to the color filter industry. However, it suffers from a drawback in that the R, G and B colored pattern is formed separately such that the spacing between each color unavoidably has variation due to the limit of the alignment mechanism in exposure. In the electrodeposition method for color filter in the prior art, the spacing is predetermined by transparent conductive electrodes preformed before each color layer is coated, therefore the back exposure will result in accurate black stripes pattern. However, the presence of the transparent conductor absorbs substantial amount of light and decrease the transparency of the color filter, and it further suffers in the difficulty in making grid type black matrix pattern. The present invention allows further reduction of the process steps and avoids using traditional photolithography equipment for forming the black matrix, as well as saving the alignment mechanism required in attaching the removable mold to a transparent substrate carrying a preformed black matrix pattern.

Figure 7:
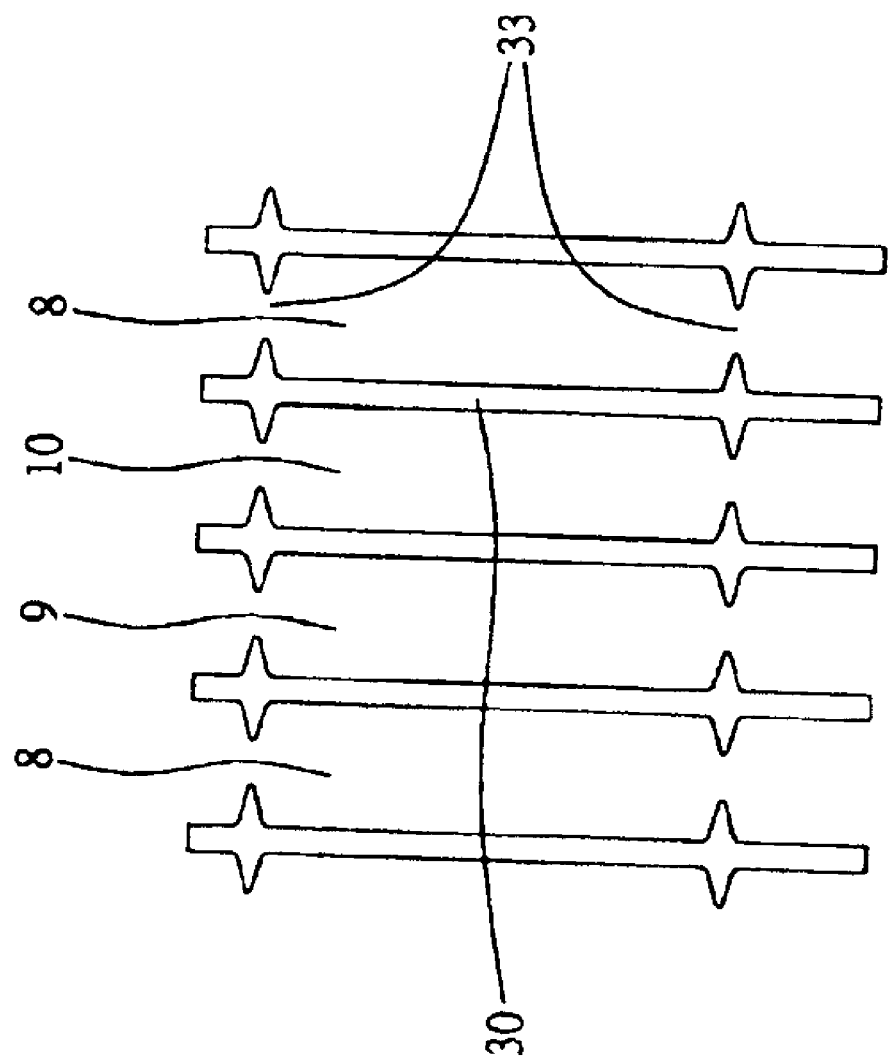
FIG. 7 is a schematic view showing an alternative configuration of the groove units of the present invention.

In simplifying the process for making the connecting holes 31, this invention further provides an alternative as referring to FIG. 7, wherein a top view of the intaglio layer surface is shown, the channel units 8, 9, 10 of each color can communicate throughout each neighboring sub-pixel via openings 33 defined in the partition walls 30 of the intaglio layer 16. After completion of fabrication of the colored sub-pixels, the black-colored photoresist layer is applied on the treated transparent substrate 5 and subject to an ultraviolet light radiation from the back side. The black-colored photoresist layer is then developed to obtain a black matrix pattern.

Advantageously, the present color filter is obtained by one-shot molding. This circumvents the conventional troublesome and time-consuming photolithographic process for forming a color filter film on a transparent substrate that has to be unduly repeated three times. Moreover, the present invention cures the colored photopolymer onto the transparent substrate wherein no overlapping between the colored film and black matrix pattern occurs as that suffered in the traditional pigment dispersion process. In the conventional pigment dispersion method, each primary color film is formed after the black matrix pattern is made. The dimension of the color pattern has to be wider than the opening of the black matrix to avoid serious light leaking defect. Therefore, as Chromium based black matrix is facing challenge on pollution concern, thick resin type black matrix of about more than one micrometer is getting more popularly used, overlapping between each color layer and the black matrix layer become serious and require additional thick overcoat to cover the raise at the overlap. This invention therefore provides a flat color filter superior in surface quality over the traditional products made by the prior arts.

A method for making a color filter for use in a transflective type liquid crystal display in accordance with a second embodiment of the present invention comprises the steps of: (1) providing a removable mold 36 having an intaglio surface with a plurality of groove units (not labeled) arranged in a predetermined pattern; (2) attaching the removable mold 36 to a transparent substrate 35 having a patterned reflective film (not labeled) coated thereon, thereby the intaglio surface and the transparent substrate 35 cooperatively forming a plurality of channel units 29; (3) introducing a photopolymer solution containing colorants into the channel units 29; (4) applying a scattering ultraviolet light 38 to the photopolymer solution through the transparent substrate 35 so as to cure the polymer to the transparent substrate 35; (5) removing the removable mold 36 with the patterned polymer layer formed on the patterned reflective film on the transparent substrate 35; and (6) applying a black-colored photoresist (not shown) to the treated transparent substrate 35, and removing unwanted portions by photolithography process.

Figure 8:
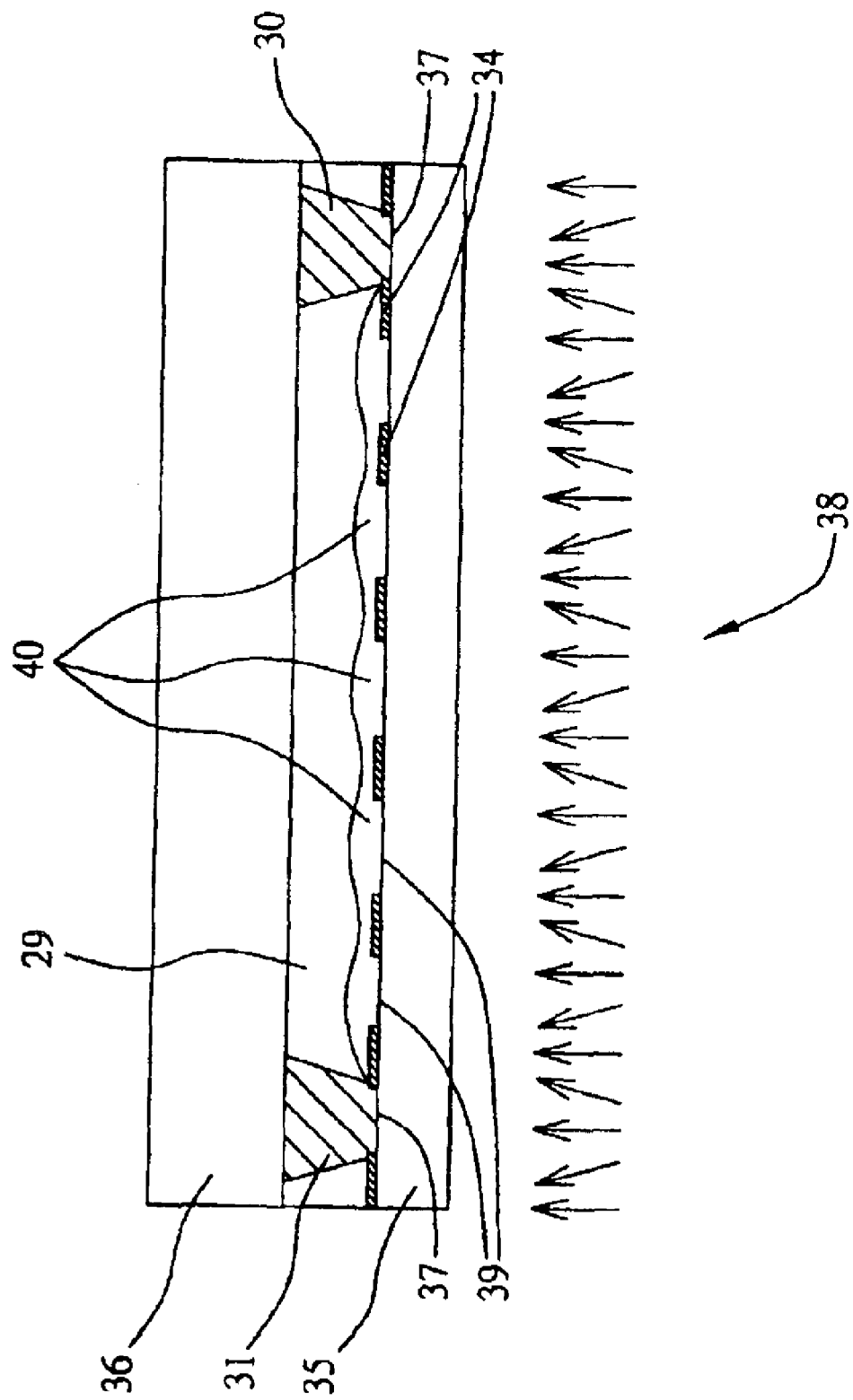
FIG. 8 is a schematic cross sectional view showing colored photopolymer cured on a patterned reflective film preformed on a transparent substrate in accordance with a second embodiment of the present invention.

FIG. 8 is a schematic cross-sectional view showing the cured polymer sub-pixel 40 formed on the patterned reflective film on the transparent substrate 35. The reflective patterned film comprises a plurality of reflective units 34 and a plurality of transmissive units 39, and a transmissive pattern 37 corresponding to the black matrix pattern. The groove units are separated by partition walls 31. The removable mold 36 is attached to the transparent substrate 35 with the partition walls 31 pressed against the area for the black matrix pattern 37. The edge-to-edge distance between neighboring transmissive units 39 is preferably less than the depth of each groove unit 29, such that the scattering UV light will be able to activate the curing reaction of the colored photopolymer solution above the reflective units 34. It is desirable that the thickness of the color filter film on the reflective film is preferably smaller than that on the tarnsmissive area, such that when the display is operated in reflective mode, the ambient light reflected from the reflective film will have balanced color tone against that observed in the tansmissive mode utilizing backlighting source which passes the color filiter film in the transmissive area only once. A thickness differentiation between the transmissive units 39 and the reflective units 34, therefore can be easily controlled through this invention.

While the preferred embodiment in accordance with the present invention has been shown and described, equivalent modifications and changes known to persons skilled in the art according to the spirit of the present invention are considered to be within the scope of the present invention as defined in the appended claims.

What is claimed is:

1. A method for forming a patterned polymer layer on a transparent substrate, the method comprising the steps in the order of:

(1) providing a removable mold having an intaglio surface with a patterned groove defined therein;

(2) attaching the removable mold to a transparent substrate, thereby the intaglio surface and the transparent substrate cooperatively forming a patterned channel;

(3) filling the patterned channel with a photopolymer solution;

(4) applying an ultraviolet light to the photopolymer solution through the transparent substrate so as to cure the photopolymer solution to the transparent substrate; and (5) removing the removable mold with the patterned photopolymer layer formed on the transparent substrate.

2. The method as described in claim 1, wherein the photopolymer solution comprises colorants contained therein.

3. A method for making a color filter comprising the steps in the order of:

(1) providing a removable mold having an intaglio surface with a plurality of groove units formed therein, the groove units being arranged in predetermined pattern;

(2) attaching the removable mold to a transparent substrate, thereby the intaglio surface and the transparent substrate cooperatively forming a plurality of channel units;

(3) filling the channel units with a photopolymer solution containing colorants;

(4) applying an ultraviolet light to the photopolymer solution through the transparent substrate so as to cure the photopolymer to the transparent substrate; and (5) removing the removable mold with the patterned photopolymer layer formed on the transparent substrate.

4. The method as described in claim 3, wherein prior to step (5), further comprising the steps of;

removing the remaining solution contained in the patterned channel;

filling a photopolymer solution that does not contain colorants into the channels;

applying an ultraviolet light to the photopolymer solution to cure the photopolymer into a leveling layer overlying the cured colored photopolymer.

5. The method as described in claim 3, wherein in step (2), the transparent substrate is first overlaid with a black matrix, the removable mold is then attached to a transparent substrate, with the patterned groove being superimposed with light-passing portions of the black matrix.

6. The method as described in claim 3, wherein in step (1), the groove units are separated by partition walls, and the groove units comprises three types of grooves in correspondence with red, green, and blue sub-pixels.

7. The method as described in claim 6, wherein in step (3), the three types of groove units are filled with corresponding red-colored, green-colored, and blue colored photopolymer solution, respectively.

8. The method as described in claim 7, wherein the neighboring groove units of a same type communicate with each other via through holes defined in the removable mold.

9. The method as described in claim 3, after step (5), further comprising the steps of:

thermal setting the colored photopolymer pattern on the transparent substrate;

applying a black-colored photoresist layer on the transparent substrate and cover the colored photopolymer pattern;

exposing the black-colored photoresist from a back side of the transparent substrate; and developing the black-colored photoresist to form a black matrix pattern.

10. The method as described in claim 9, wherein in step (1), a patterned reflective film is coated on the transparent substrate prior to attaching the removable mold to a transparent substrate, and said pattern comprises a light-passing black matrix pattern, a plurality of another light-passing openings, with edge-to-edge distance between each neighboring opening no bigger than the depth of the groove, within the areas of each sub-pixels; and the said ultra violet light is scattering in radiation path.

* * * * *